No. 839,831. PATENTED JAN. 1, 1907.
E. J. GEORGE.
GUARD FOR EYEGLASSES.
APPLICATION FILED JAN. 22, 1906.

Witnesses
M. F. Olsen.
Louis B. Erwin.

Inventor:
Edgar J. George
By Rector, Hibben & Davis
His Atty's

UNITED STATES PATENT OFFICE.

EDGAR J. GEORGE, OF CHICAGO, ILLINOIS.

GUARD FOR EYEGLASSES.

No. 839,831.      Specification of Letters Patent.      Patented Jan. 1, 1907.

Application filed January 22, 1906. Serial No. 297,347.

*To all whom it may concern:*

Be it known that I, EDGAR J. GEORGE, a citizen of the United States, residing at Chicago, Cook county, Illinois, have invented certain new and useful Improvements in Guards for Eyeglasses, of which the following is a specification.

My invention relates to guards for eyeglasses; and the object thereof is to produce guards of this character of improved form and construction and possessing features of advantage and utility, as will be hereinafter made apparent.

Figure 1:
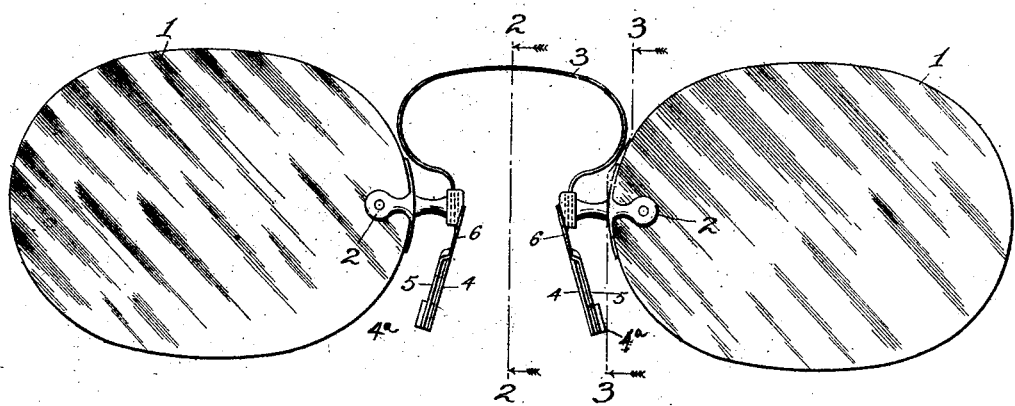
Figure 2:
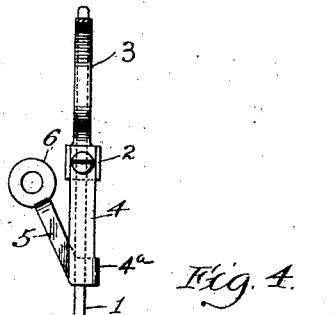
Figure 3:
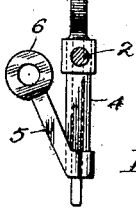

In the drawings, Figure 1 is a rear view of a pair of eyeglasses, showing guards embodying my invention. Fig. 2 is a transverse section taken on the line 2 2 of Fig. 1; Fig. 3, a section taken on the line 3 3 of Fig. 1, and Fig. 4 a bottom plan view of the guard.

The same numerals of reference indicate the same parts in the several views.

Referring to the present embodiment of my invention as illustrated in the drawings, the lenses 1 of the eyeglasses are mounted as usual on the posts 2, to which the ends of the spring 3 are secured. My form of guard, which is secured to the posts in any suitable manner, comprises the main portions or arms 4, arranged to bear on opposite sides of the nose and the supplemental or side arms 5, formed integral with the main arms and extending rearwardly in such manner as to bear or press inwardly toward the top of the nose and near the inner corners of the eyes. By preference my guard is formed of thin resilient material, and as herein shown both the main arms and the supplemental arms are formed from a single piece of material. As shown in the drawings, particularly Figs. 2, 3, and 4, the supplemental arms proceed from the forward edges of their respective main arms at or near the lower ends thereof and are connected therewith by vertical outward bends, which are recurved, so that the supplemental arms extend inwardly, upwardly, and rearwardly, by preference terminating in suitable bearing-surfaces, such as 6.

Figure 4:
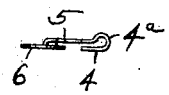

As hereinbefore stated, the main arms are arranged to bear against opposite sides of the nose while the supplemental arms are arranged to bear near the inner corners of the eyes or toward the upper end of the nose and inwardly as respects the points of bearing of the main arms, with the result that the glasses are more firmly held in position and prevented from tilting or being shaken off. It is desirable and in many cases necessary to so adjust these supplemental arms as to fit the nose of the wearer of the glasses, and to this end I so construct my guard that these supplemental arms may be readily adjusted both laterally and forwardly or rearwardly, as may be required for the particular case. Inasmuch as the supplemental arms proceed from the edges of the main arms on vertical bends—that is to say, on bends which are bent or folded upon axes approximately parallel to said main arms—I am enabled to readily make the required adjustments of the supplemental arms and at the same time secure the proper tension thereof. Moreover, by preference and as illustrated in Fig. 4, the supplemental arms have a connection with the main arms in the form of a loop 4ª, which permits of the more ready and efficient adjustment of the supplemental arms and also provides for greater resiliency in the side or supplemental arms.

By the use of my improved form of guard I am enable to readily adjust the supplemental arms to every case and to also vary or adjust the tension of these supplemental arms according to the degree or character of bend imparted to such arms.

Having thus fully described my invention, I claim—

1. A guard for eyeglasses having main arms or bearing portions, and upwardly and inwardly extending spring-arms connected therewith by bends approximately parallel with said main arms.

2. A guard for eyeglasses formed of resilient metal and comprising main bearing-arms, and upwardly and inwardly extending supplemental spring-arms connected therewith by bends approximately parallel with said main arms.

3. A guard for eyeglasses having resilient main arms, and upwardly and rearwardly extending resilient arms connected therewith by outward bends approximately parallel with said main arms.

4. A guard for eyeglasses formed of resilient material and comprising main arms, and upwardly and rearwardly extending supplemental arms connected with said main arms by outward bends which are approximately parallel with said main arms, said supplemental arms terminating in bearing-surfaces.

5. A guard formed of a single piece of metal and comprising main arms and supplemental arms proceeding from the front edges of the lower ends of the main arms and extending upwardly and rearwardly.

6. A guard for eyeglasses comprising main arms and supplemental arms proceeding from the front edges of the lower ends of the main arms and formed of resilient material, and arranged to be bent and thereby adjusted forwardly or rearwardly with respect to the main arms.

7. A guard for eyeglasses formed from a single piece of resilient material and comprising main arms and supplemental arms proceeding from the front edges of the main arms on vertical bends and extending upwardly and rearwardly of the main arms, said supplemental arms being capable of being bent and adjusted to different positions forwardly and rearwardly with respect to the main arms.

8. A guard for eyeglasses formed from a single piece of resilient material and comprising main arms and supplemental arms connected with the front edges of the main arms by loop-shaped bends, said supplemental arms extending upwardly and rearwardly with respect to the main arms.

EDGAR J. GEORGE.

Witnesses:
S. E. HIBBEN,
SYLVIA BLISS.